United States Patent
Kanne et al.

(10) Patent No.: US 7,255,087 B2
(45) Date of Patent: Aug. 14, 2007

(54) METHOD FOR CONTROLLING AN INJECTION SYSTEM OF AN INTERNAL COMBUSTION ENGINE

(75) Inventors: Sebastian Kanne, Schwaikheim (DE);
Godehard Nentwig, Stuttgart (DE);
Markus Jungemann, Stuttgart (DE);
Rainer Keck, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/498,476

(22) Filed: Aug. 2, 2006

(65) Prior Publication Data
US 2007/0056563 A1    Mar. 15, 2007

(30) Foreign Application Priority Data
Aug. 2, 2005   (DE)   ............ 10 2005 036 192

(51) Int. Cl.
*F02B 3/10*   (2006.01)
(52) U.S. Cl. .............. 123/299; 701/105; 701/106
(58) Field of Classification Search ........ 123/299; 701/105, 106
See application file for complete search history.

(56) References Cited

U.S. PATENT DOCUMENTS

| | | | |
|---|---|---|---|
| 5,402,760 A * | 4/1995 | Takeuchi et al. ........... | 123/300 |
| 6,311,669 B1 * | 11/2001 | Przymusinski et al. ..... | 123/300 |
| 6,752,126 B2 * | 6/2004 | Pfaeffle et al. ............ | 123/436 |
| 6,918,375 B2 * | 7/2005 | Serizawa et al. ........... | 123/447 |
| 7,152,575 B2 * | 12/2006 | Fritsch et al. ............ | 123/299 |
| 2003/0029415 A1 * | 2/2003 | Pfaeffle et al. ............ | 123/299 |
| 2006/0259227 A1 * | 11/2006 | Fritsch et al. ............ | 701/104 |

FOREIGN PATENT DOCUMENTS

| | | |
|---|---|---|
| DE | 100 02 270 | 6/2001 |
| DE | 101 23 035 | 1/2002 |

* cited by examiner

*Primary Examiner*—Erick Solis
(74) *Attorney, Agent, or Firm*—Kenyon & Kenyon LLP

(57) ABSTRACT

A method for controlling an injection system of an internal combustion engine having at least one injector, the fuel metering being divided into a first partial injection and at least one second partial injection, and a control signal which determines the fuel quantity to be injected with the aid of the at least one injector being corrected as a function of a pressure wave influencing the at least two partial injections, the pressure wave correction being performed on the basis of a periodic model which models the quantity wave as a sum of periodic functions.

8 Claims, 3 Drawing Sheets

METHOD FOR CONTROLLING AN INJECTION SYSTEM OF AN INTERNAL COMBUSTION ENGINE

FIELD OF THE INVENTION

The present invention relates to a method for controlling an injection system of an internal combustion engine having at least one injector and to a corresponding control unit.

BACKGROUND INFORMATION

In fuel injection systems, of self-igniting engines in particular, the fuel quantities injected by injectors into the combustion chambers are divided into a plurality of partial injections. The partial injections usually follow one another in a rapid succession and may include one or more pilot injection(s) applied before a main injection. The time interval between two partial injections is implemented by the pause time between two electric trigger pulses of the injectors. The partial injections make improved mixture preparation and thus lower exhaust gas emissions of the engine, lower noise development during combustion, and higher mechanical power output of the engine possible.

In the case of the above-mentioned partial injections, the accuracy of the injected quantities is of great importance. However, each injection causes a brief drop in the fuel pressure in a fuel line connecting a high-pressure accumulator, known as a rail, to the corresponding injector. Such a pressure drop results in a fuel pressure wave between the rail and the injector after the end of the injector triggering; the effect of this wave on the injected quantity of the subsequent partial injections diminishes with an increasing time interval between the particular successive injections. This pressure wave effect intensifies with increasing lift frequency of the nozzle needle of the injector, so that taking it into account, also in future injector systems in particular, in which high-speed piezoelectric actuators are used as injection actuators for nozzle needle control in the particular injector, becomes increasingly important.

Since the above-described pressure wave phenomenon is of a highly systematic nature, and although it essentially depends on the time interval between the corresponding injection(s), the injected fuel quantity, the hydraulic fuel pressure, and the fuel temperature in the rail, compensation via an appropriate control function in the engine control unit may be implemented. In a method described in German Patent Application No. DE 101 23 035 for minimizing the pressure wave effect, the effect on the injected quantity of the particular injector is measured and the results of this measurement are taken into account in presetting the control data of the injector, specifically based on a previously empirically, i.e., experimentally, determined fuel quantity wave as a function of the time interval between the partial injections involved. The measured effect of the quantity on a subsequent injection is stored in characteristic maps, and the effect of the quantity is then compensated during the operation of the engine by appropriately modifying the duration of the energized state of the actuator which effects the subsequent injection.

The characteristic map is filled with data experimentally by measurements on a hydraulic test bench. The quantities influenced are ascertained in the form of "quantity waves" as a function of the interval between the corresponding injections and used for filling the characteristic map with the aid of a special algorithm. The excess or reduced quantities thus ascertained are stored in the above-mentioned characteristic maps and compensated during the operation of a control program of the engine by making the appropriate deductions in a quantity path of the engine control.

In the above-mentioned pressure wave correction, in principle a number of input and output quantities must be taken into account, the exact relationship between these quantities being extremely complex, since there are mutual dependencies such as interactions between the input quantities in particular. For this reason, considerable simplifications are necessary in the pressure wave correction to map the pressure wave phenomenon using the fewest possible characteristics maps; therefore, when mapping the pressure wave system, a considerable portion of the correction accuracy that would be possible in principle is lost.

It is therefore desirable to improve a method of the type mentioned above in such a way that a more accurate pressure wave correction than in the related art is made possible, which takes into account the largest possible number of input and/or output quantities in the pressure wave correction, omitting the fewest possible factors considered negligible, while using the least possible technical complexity at the same time.

SUMMARY OF THE INVENTION

The present invention is based on the idea of performing the pressure wave correction on the basis of a model which takes into account the empirically found fact that it is possible to represent the quantity waves as a continuously oscillating system. The basic idea of the present invention is that the quantity wave is modeled as a sum of a plurality of periodic functions. A great advantage of the method according to the present invention for controlling an injection system of an internal combustion engine is its simple and easily reproducible pressure wave correction structure, which makes it possible to considerably improve the correction accuracy compared to the methods known from the related art. In principle, the pressure waves may be modeled using the most diverse periodic functions.

In an advantageous embodiment of the present invention, the periodic functions are sine functions.

The periodic functions are preferably decaying periodic functions, i.e., sine functions that decay over time, for example. The parameters of the sine function, in particular its frequency, amplitude, damping, zero point displacement, and the like are advantageously determined as a function of the pressure and/or the quantity of the first partial injection and/or the quantity of the at least second partial injection, these functions being determined by adaptation to tests or simulations. The sine function parameters are advantageously stored in a memory of a control unit, which ensures that they are promptly accessible during the operation of the engine.

The quantity of a partial injection following a preceding partial injection which triggers a pressure wave is corrected. This makes a direct pressure wave correction possible.

DETAILED DESCRIPTION

Figure 1:
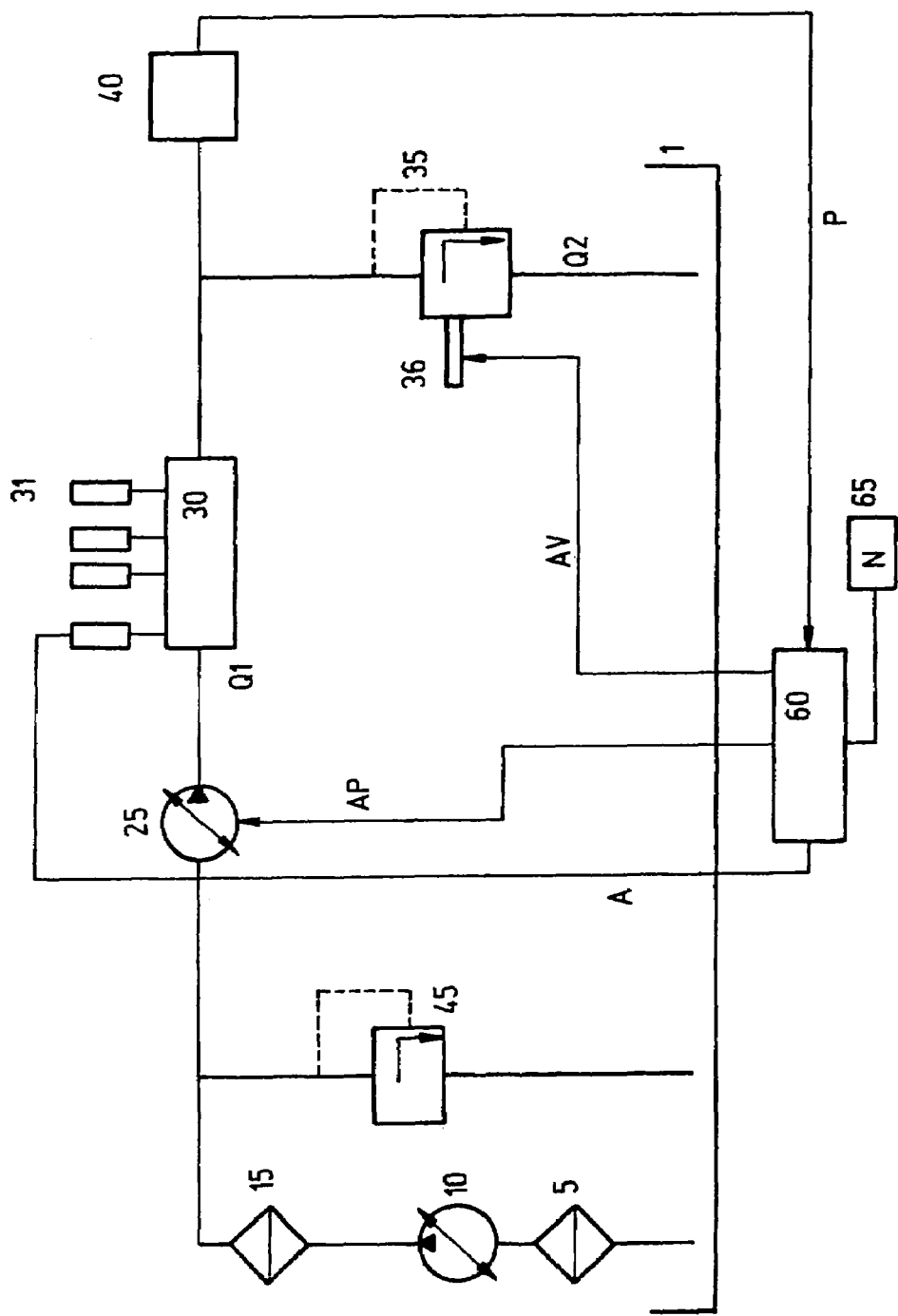
FIG. 1 schematically shows a common rail injection system which is known from the related art and is suitable for use in the present invention.

FIG. 1 shows the components of a high-pressure based fuel injection system necessary for understanding the present invention using the example of a common rail (CR) injection system. A fuel reservoir is labeled with the numeral 1. Fuel reservoir 1 is connected to a second filter 15 for pumping fuel via a first filter 5 and a presupply pump 10. From second filter 15 the fuel is pumped to a high-pressure pump 25 via a line. The connecting line between second filter 15 and high-pressure pump 25 is also connected to the reservoir 1 via a connecting line having a low-pressure limiting valve 45. High-pressure pump 25 is connected to a rail 30. Rail 30 is also known as a (high-pressure) accumulator and is in turn connected in a pressure-conducting manner to different injectors 31 via fuel lines. Rail 30 is connectable to fuel reservoir 1 via a pressure release valve 35. Pressure release valve 35 is controllable by a coil 36.

The lines between the discharge of high-pressure pump 25 and the inlet of pressure release valve 35 are referred to as a "high-pressure area." The fuel is under high pressure in this area. The pressure in the high-pressure area is detected with the aid of a sensor 40. In contrast, the lines between fuel reservoir 1 and high-pressure pump 25 are referred to as a "low-pressure area." A controller 60 sends trigger signal AP to high-pressure pump 25, trigger signals A to each injector 31, and/or a trigger signal AV to pressure release valve 35. Controller 60 processes different signals of various sensors 65, which characterize the operating state of the engine and/or of the motor vehicle propelled by this engine. Such an operating state is, for example, speed N of the engine.

The injection system depicted in FIG. 1 operates as follows. The fuel stored in fuel reservoir 1 is pumped by presupply pump 10 through first filter 5 and second filter 15. If the pressure in the above-mentioned low-pressure area increases to inadmissibly high levels, low-pressure limiting valve 45 opens and clears the connection between the discharge of presupply pump 10 and reservoir 1. High-pressure pump 25 pumps fuel quantity QI from the low-pressure area into the high-pressure area. In doing so, high pressure pump 25 builds up a very high pressure in rail 30. Normally, maximum pressure values of approximately 30 bar to 100 bar are achieved for injection systems of externally ignited engines and 1000 bar to 2000 bar for self-igniting engines. The fuel may thus be metered to the individual combustion chambers (cylinders) of the engine under high pressure using injectors 31. Pressure $P_{rail}$ in the rail, i.e., in the entire high-pressure area, is detected by sensor 40. The pressure in the high-pressure area is regulated using controllable high-pressure pump 25 and/or pressure release valve 35. Electric fuel pumps are normally used as presupply pump 10. For pumping higher quantities, which are required for utility vehicles in particular, a plurality of presupply pumps connected in parallel may also be used.

Figure 2:
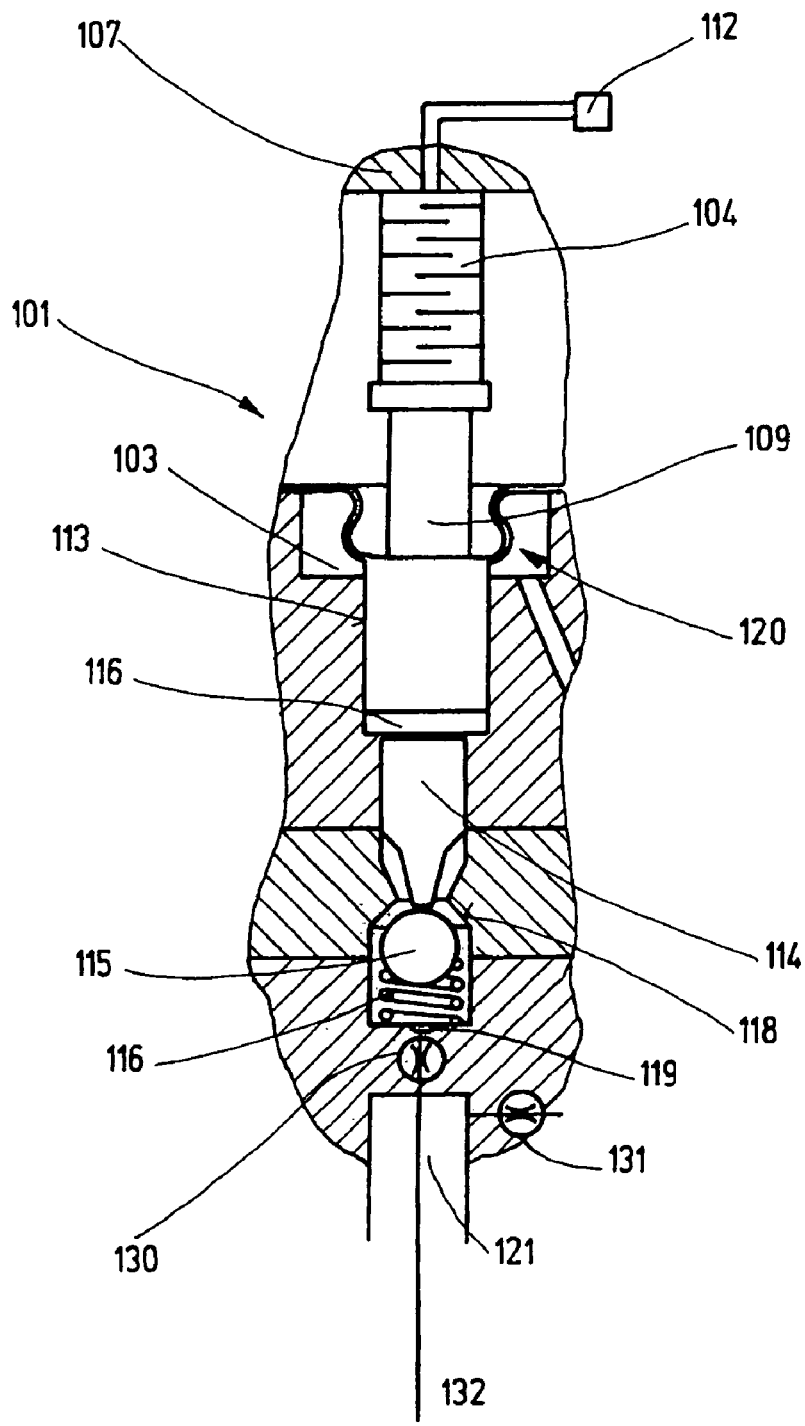
FIG. 2 schematically shows a longitudinal partial section through a fuel injector of an injection system depicted in FIG. 1.

FIG. 2 shows a piezoelectrically driven injector 101 described in German Patent No. DE 100 02 270 in partial section. Injector 101 has a piezoelectric unit 104 for operating a valve element 103 axially movable in a bore 113 of a valve body 107. Injector 101 also has an adjusting piston 109 next to piezoelectric unit 104 and an operating piston 114 next to a valve closing element 115. A hydraulic chamber 116 operating as a hydraulic transmission is situated between pistons 109, 114. Valve closing element 115 cooperates with at least one valve seat 118, 119 and separates a low-pressure area 120 from a high-pressure area 121. An electric control unit 112, shown only schematically, delivers the trigger voltage for piezoelectric unit 104 as a function of the prevailing pressure level in high-pressure area 121. An outflow throttle 130 and an inflow throttle 131 are additionally situated in high-pressure area 121 of injector 101. The outflow/inflow adjustment ratio of these two throttles 130, 131 is set with the aid of a control valve 132.

Figure 3:
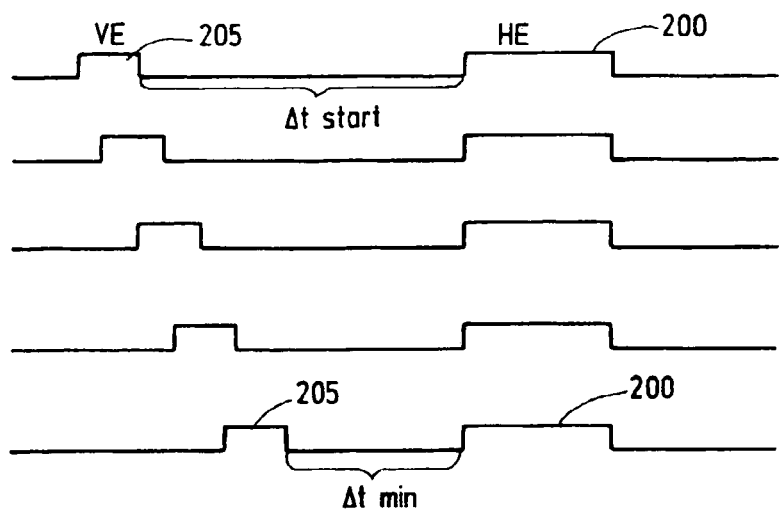
FIG. 3 shows an injection sequence, known per se, having a main injection and a pilot injection using appropriate triggering signals of an injection actuator, in particular for illustrating the pressure wave effect.

FIG. 3 shows typical trigger signal curves for an injector shown in FIGS. 1 and 2 in the case of a main injection 200 and a preceding pilot injection 205. The five signal curves shown represent different triggering states over time, in which the time interval (electrical pause time) between the two trigger signals 200, 205, viewed from above downward, is reduced stepwise to a minimum value delta_t_min. Let us now assume that the time interval resulting from the calibration, delta_t_start, is selected in such a way that a pressure wave in the rail caused by pilot injection 205 has decayed again by the time main injection 200 is triggered. Such values are known beforehand in the form of empirical values. Let us furthermore assume that time difference delta_t_min between the injections represented by the lowermost curve corresponds to a minimum time interval in which the pressure wave caused by pilot injection 205 already results in a measurable change in a performance quantity, preferably in a change in the torque of the engine.

Of course, the two injections depicted in FIG. 3 are only for illustration purposes, and therefore the method according to the present invention is also applicable to the calibration of a plurality of injections over time; even individual successive pilot injections may be influenced as described here because of the pressure waves.

The above-mentioned pressure wave effect may be explained with reference to FIG. 3 as follows. If pilot injection 'VE' 205 is separated from main injection 'HE' 200 by a sufficiently long time interval, i.e., in this case by the interval delta_t_start, the pressure wave triggered by it has already decayed by the time of main injection 200 and therefore no longer has any effect on the fuel quantity injected during the main injection. Because of the wave velocity, which is, as is known, pressure-dependent, this time interval is essentially a function of the instantaneous pressure in the rail, among other things. An empirically ascertained suitable starting value for delta_t_start is >2 ms. If the above-mentioned time interval is now varied by keeping the start of the main injection triggering constant but moving the time of the pilot injection closer to the main injection, the main injection quantity will be influenced starting at a certain time interval since, because of the pressure wave, the pressure, in particular in the area of the injector nozzle needle shown in FIG. 2 at the time of and during opening of the nozzle needle, is either increased due to a wave crest or reduced due to a wave valley. This results in a quantity effect or torque effect, which may be sensed via a speed signal of the engine, for example. Alternatively, the quantity effect may also be sensed, as is known, via a lambda sensor or its controller.

Figure 4:
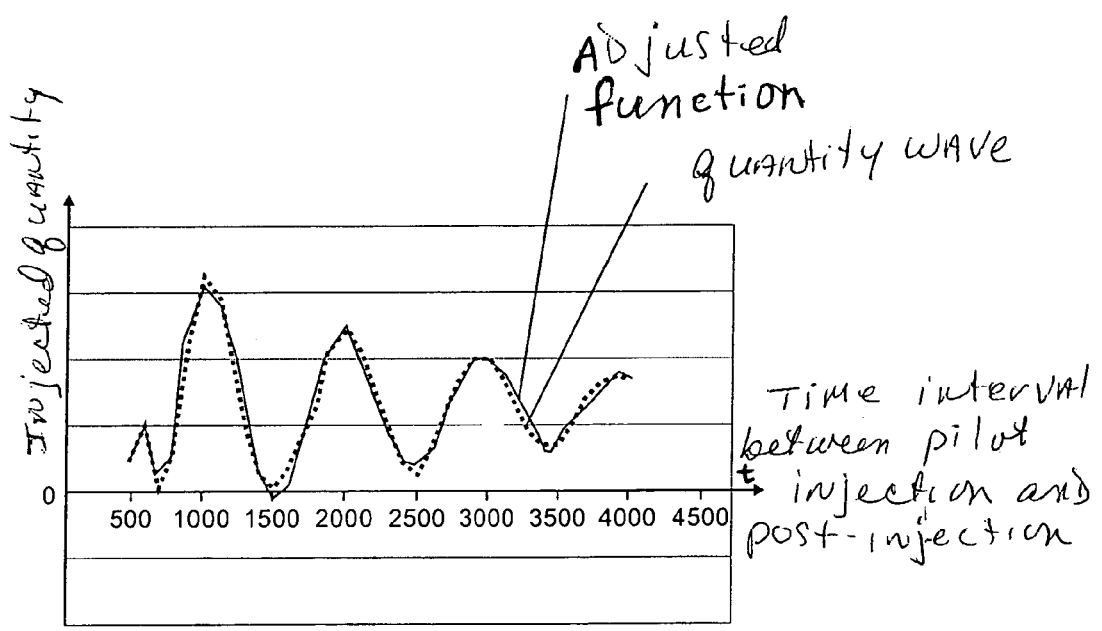
FIG. 4 schematically shows the quantity wave plotted against time and a function of the quantity wave, adapted using the method of the present invention, plotted against time.

The pressure wave correction according to the present invention is performed by the following steps:

a. In a system simulation, the quantity waves are determined for a certain number of combinations of pilot injections, main injections, and rail pressures;

b. the quantity waves are adjusted by a sum of two sine functions (see FIG. 4, where the quantity wave in the 800 bar rail pressure and a function thus adjusted plotted against time are depicted);

c. the parameters of the sine function, i.e., for example, the frequency, amplitude, damping, and zero point displacement, for example, may be almost fully represented as a function of the pressure and/or of the pilot injection quantity and/or the main injection quantity, for example; these functions are also adjusted;

d. the functions ascertained in points b. and c., and possibly other non-correlatable quantities, are stored in the memory of control unit 60;

e. the quantity is then corrected in the control unit as follows: The requested main injection quantity, pilot injection quantity, time difference, and rail pressure are used to determine the actual quantity. The quantity request is corrected accordingly. To achieve higher accuracy, this procedure may be iteratively repeated.

What is claimed is:

1. A method for controlling an injection system of an internal combustion engine having at least one injector, the method comprising:
    dividing a fuel metering into a first partial injection and at least one second partial injection;
    correcting a control signal which determines a fuel quantity to be injected with the aid of the at least one injector as a function of a pressure wave influencing the first and second partial injections; and
    performing a pressure wave correction on the basis of a periodic model which models a quantity wave as a sum of periodic functions.

2. The method according to claim 1, wherein the periodic functions are sine functions.

3. The method according to claim 1, wherein the periodic functions are periodic functions decaying over time.

4. The method according to claim 2, further comprising determining parameters of the sine functions, including their frequency, amplitude, damping, and zero point displacement, as a function of at least one of (a) at least one of a pressure and a quantity of the first partial injection and (b) a quantity of the at least one second partial injection.

5. The method according to claim 2, further comprising storing parameters of the sine functions in a memory of a control unit.

6. The method according to claim 1, further comprising correcting in each instance a quantity of a partial injection, which follows a preceding partial injection that triggers a pressure wave.

7. A control unit for controlling an injection system of an internal combustion engine having at least one injector, the control unit comprising a computing/control device for performing the following:
    dividing a fuel metering into a first partial injection and at least one second partial injection;
    correcting a control signal which determines a fuel quantity to be injected with the aid of the at least one injector as a function of a pressure wave influencing the first and second partial injections; and
    performing a pressure wave correction on the basis of a periodic model which models a quantity wave as a sum of periodic functions.

8. A computer-readable medium storing a computer program which, when executed by a processor, performs the following steps for controlling an injection system of an internal combustion engine having at least one injector:
    dividing a fuel metering into a first partial injection and at least one second partial injection;
    correcting a control signal which determines a fuel quantity to be injected with the aid of the at least one injector as a function of a pressure wave influencing the first and second partial injections; and
    performing a pressure wave correction on the basis of a periodic model which models a quantity wave as a sum of periodic functions.

* * * * *